(12) United States Patent
Chen et al.

(10) Patent No.: US 8,513,963 B2
(45) Date of Patent: Aug. 20, 2013

(54) RADIO FREQUENCY TESTING APPARATUS

(75) Inventors: He-Ping Chen, Shenzhen (CN); Jun-Jie Deng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 252 days.

(21) Appl. No.: 13/188,474

(22) Filed: Jul. 22, 2011

(65) Prior Publication Data
US 2012/0274345 A1   Nov. 1, 2012

(30) Foreign Application Priority Data
Apr. 29, 2011 (CN) .......................... 2011 1 0110692

(51) Int. Cl.
*G01R 31/00* (2006.01)
(52) U.S. Cl.
USPC ............... 324/750.26; 324/750.27; 324/96; 324/627; 324/756.01; 455/67.1; 455/67.2; 455/67.4; 455/425; 455/226.1
(58) Field of Classification Search
USPC .................................................... 324/750.26
See application file for complete search history.

(56) References Cited

U.S. PATENT DOCUMENTS

| | | | |
|---|---|---|---|
| 2005/0176376 A1* | 8/2005 | Liu ........................... | 455/67.16 |
| 2006/0194553 A1* | 8/2006 | Ozaki et al. ................ | 455/226.1 |
| 2010/0113011 A1* | 5/2010 | Gregg et al. .................. | 455/425 |
| 2012/0122406 A1* | 5/2012 | Gregg et al. ............... | 455/67.11 |
| 2012/0140431 A1* | 6/2012 | Faxvog et al. ................ | 361/818 |
| 2012/0176907 A1* | 7/2012 | Hartenstein et al. .......... | 370/241 |

* cited by examiner

*Primary Examiner* — Arleen M Vazquez
*Assistant Examiner* — Thang Le
(74) *Attorney, Agent, or Firm* — Altis Law Group, Inc.

(57) ABSTRACT

A radio frequency (RF) testing apparatus, for testing device under test (DUT) comprising a receiving antenna, includes a pair of transmitting antennas transmitting wireless communication signals to the receiving antenna, a shielding box, a first filter and a second filter. The shielding box includes a transmitting box, a receiving box for receiving the DUT, a connecting box connecting between the transmitting box and the receiving box and a pair of transmitting antennas fixed on the transmitting box and suspending towards the connecting box. The connecting box includes a microwave absorption medium on the connecting box and communicates with the receiving box. The first filter is mounted on the connecting box and the transmitting box to electrically connect with the transmitting antenna. The second filter is mounted on the receiving box to electrically connect with the DUT.

12 Claims, 4 Drawing Sheets

RADIO FREQUENCY TESTING APPARATUS

BACKGROUND

1. Technical Field

The present disclosure relates to a testing apparatus, and more particularly to a radio frequency (RF) testing apparatus.

2. Description of Related Art

It is necessary for wireless communication devices to undergo radio frequency (RF) testing in a factory. However, because of external interference signals, traditional testing apparatuses cannot work normally which causes the wireless communication devices have a low sensitivity. In this condition, there is a great deal of high frequency electromagnetism leaking from the testing apparatuses that affects the surrounding workers and devices.

Therefore, a need exists in the industry to overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
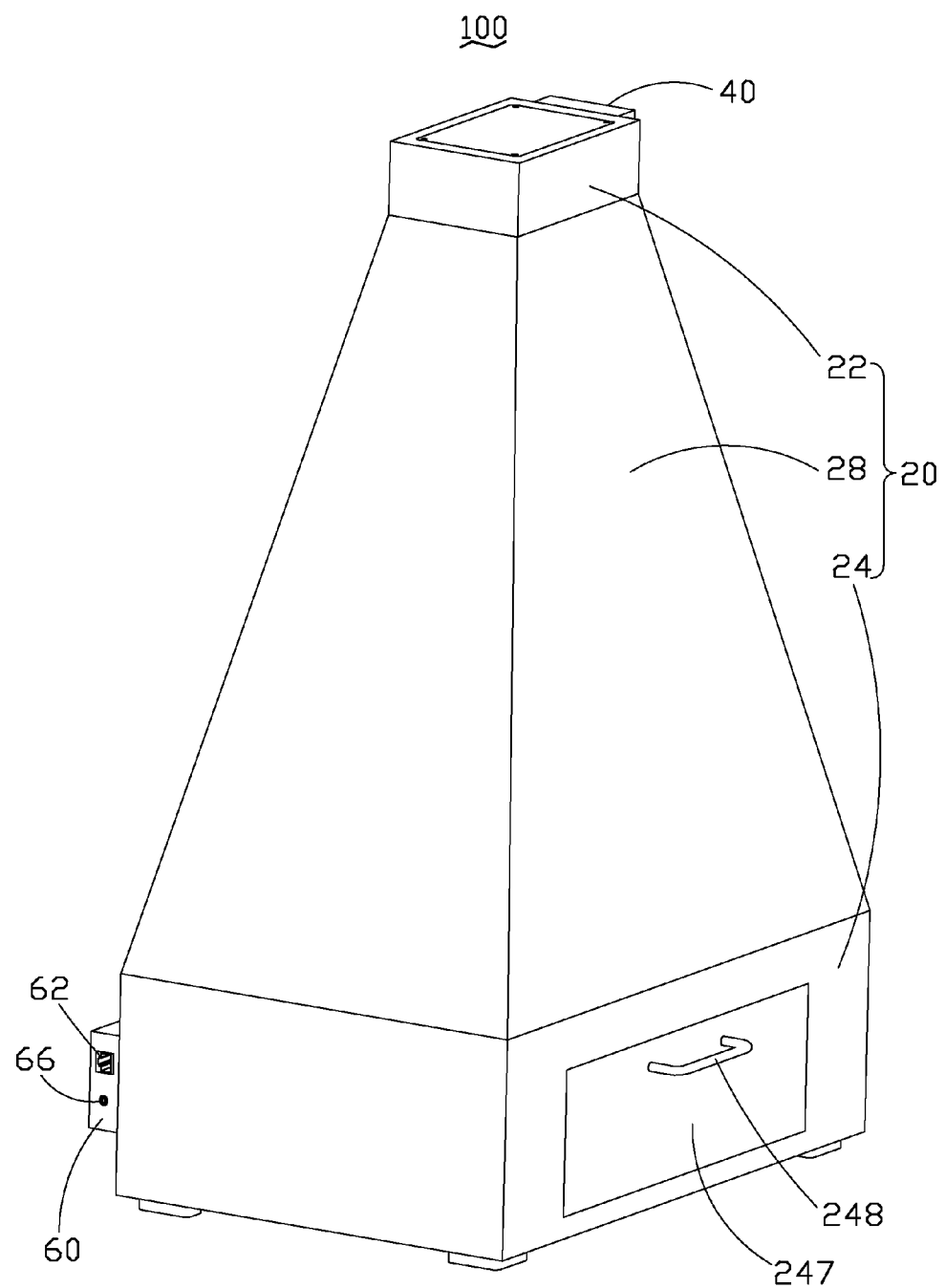
FIG. 1 is a perspective view of an exemplary embodiment of a radio frequency (RF) testing apparatus in accordance with the present disclosure.
Figure 2:
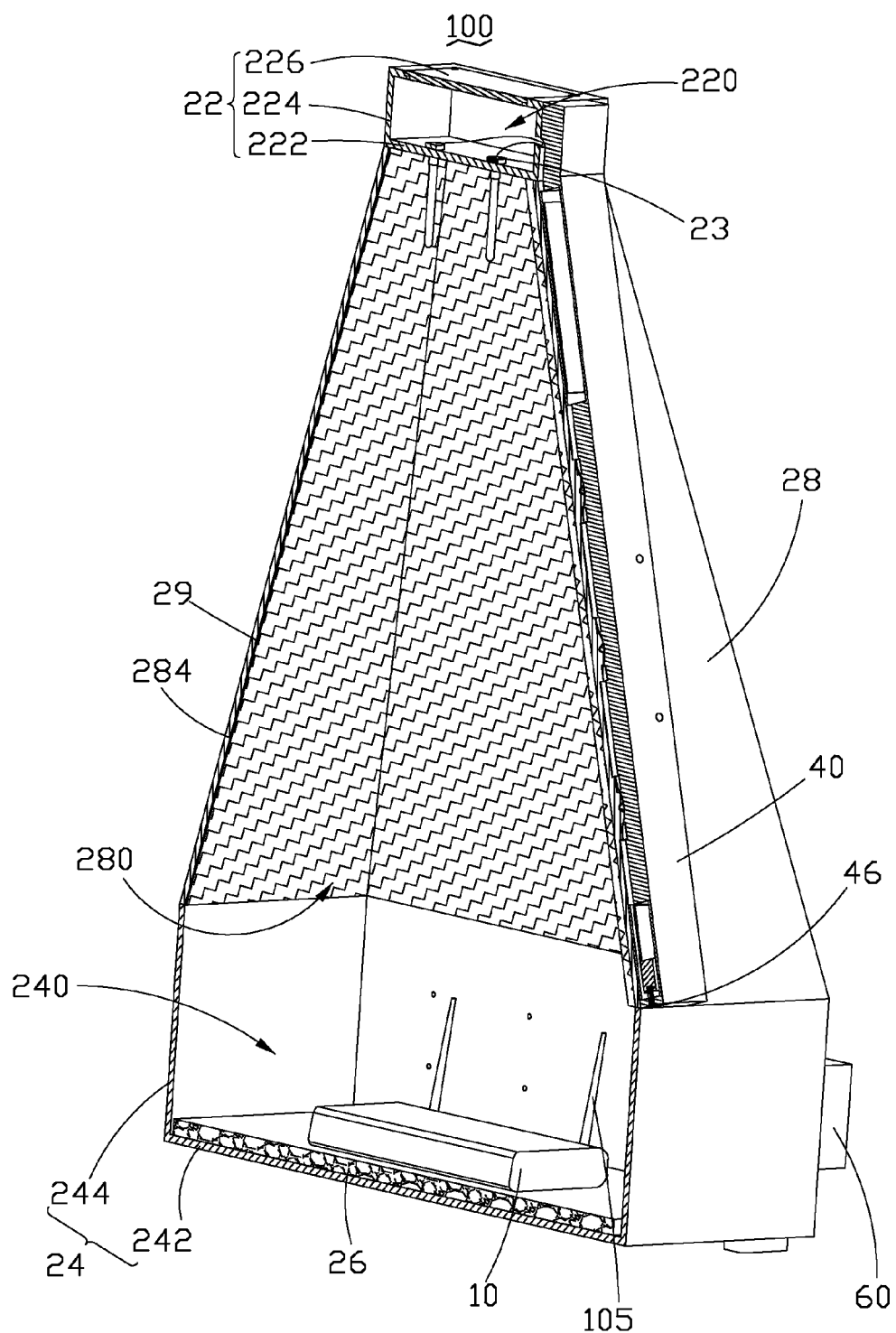
FIG. 2 is a sectional view of the exemplary embodiment of the RF testing apparatus on a direction in accordance with the present disclosure.

Referring to FIG. 1, a radio frequency (RF) testing apparatus 100 is used to test device under test (DUT) 10 (as shown in FIG. 2), such as wireless routers, switches, mobile phones, for example. The RF testing apparatus 100 comprises a shielding box 20, a first filter 40 and a second filter 60. The shielding box 20 comprises a transmitting box 22, a receiving box 24 and a connecting box 28 connected between the transmitting box 22 and the receiving box 24. In the illustrated embodiment, the shielding box 20 is substantially in a funnel-shape. The first filter 40 is mounted on outer surfaces of the connecting box 28 and the transmitting box 22, and the second filter 60 is mounted on an outer surface of the receiving box 24. The first filter 40 and the second filter 60 are used to doubly filter microwave interference signals so as to prevent transmission of microwave interference signals into the shielding box 20 from a surrounding environment.

Figure 3:
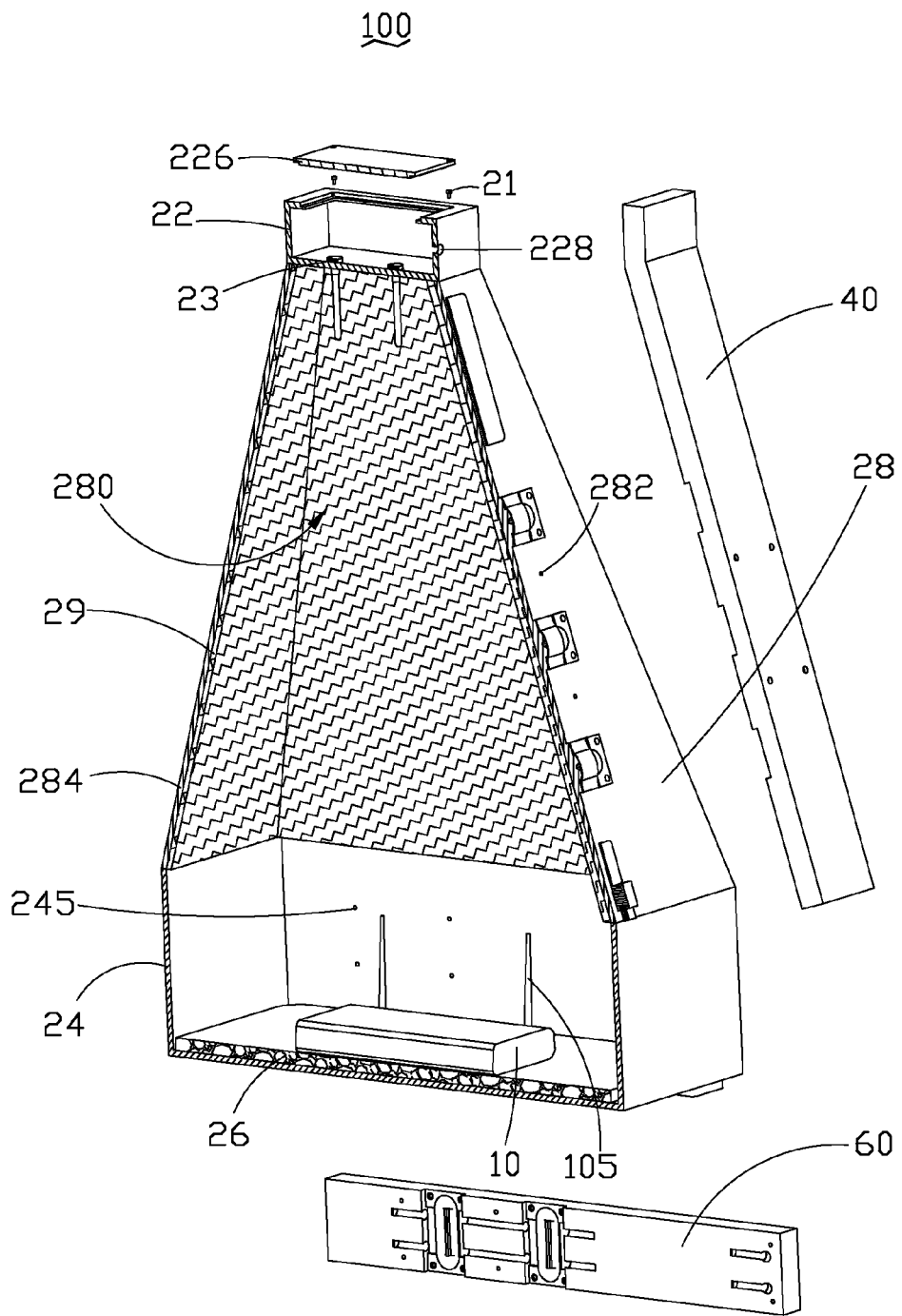
FIG. 3 is a disassembled view of the exemplary embodiment of the RF testing apparatus in accordance with the present disclosure.

Referring to FIG. 2 and FIG. 3, the transmitting box 22 comprises a first bottom wall 222, a plurality of first side walls 224 surrounding the first bottom wall 222 and a cover board 226 opposite to the first bottom wall 222. The plurality of first side walls 224 perpendicularly extends from edges of the first bottom wall 222 toward corresponding edges of the cover board 226 to collectively form a close box. The first bottom wall 222 and the plurality of first side walls 224 collectively define a first receiving space 220.

The receiving box 24 is opposite to the transmitting box 22, and comprises a second bottom wall 242 and a plurality of second side walls 244 perpendicularly extending from edges of the second bottom wall 242. The second bottom wall 242 and the plurality of second side walls 244 collectively define a second receiving space 240. Referring to FIG. 1, the receiving box 24 comprises a shielding door 247 pivoting to one of the plurality of second side walls 244 to provide an entrance that allows the DUT 10 to be received into the receiving box 24. A handle 248 is fixed onto the shielding door 247 to open or close the shielding door 247. The receiving box 24 comprises a foam portion 26 for holding the DUT 10. The foam portion 26 is configured on the second bottom wall 242 to absorb microwave signals and to prevent microwave signals from reflecting. The DUT 10 is deposited on the foam portion 26 in the second receiving space 240 by pulling the handle 248 and opening the shielding door 247.

The connecting box 28 securely connects between the transmitting box 22 and the receiving box 24. The connecting box 28 comprises a plurality of third side walls 284 tightly jointed with each other. In the illustrated embodiment, the connecting box 28 can be made into a funnel-shaped by a punching method. The plurality of third side walls 284 collectively define a through cavity 280. One ends of the plurality of third side walls 284 are securely mounted to one side of the first bottom wall 222 away from the first side walls 224, and the other ends of the plurality of third side walls 284 are securely connected to the plurality of second side walls 244 with the through cavity 280 communicating with the second receiving space 240. Therefore, the connecting box 28 is substantially sealed by the first bottom wall 222 and the second bottom wall 242.

The shielding box 20 comprises a microwave absorption medium 29 attached on the plurality of third side walls 284 to absorb microwave signals and to prevent microwave signals from reflecting. The microwave absorption medium 29 is substantially configured in a sawtooth shape. The microwave absorption medium 29 may be but not limit to flexible rubber absorption material, foam absorption material or dope absorption material. In the illustrated embodiment, the microwave absorption medium 29 is suitable for absorbing microwave signals with the frequency range of 2-6 GHz.

The RF testing apparatus 100 further comprises a pair of transmitting antennas 23 with one end of each of the pair of transmitting antennas 23 fixed on the first bottom wall 222 and the other end suspending towards the connecting box 28. The transmitting box 22 defines a first through hole 228 in one of the plurality of first side walls 224 on which the first filter 40 attached. The pair of transmitting antennas 23 electrically connects with the first filter 40 by electrical wires 70 passing through the first through hole 228. The first filter 40 comprises a first communication terminal 46 for receiving supply signal sources and electrical power provided to the pair of transmitting antennas 23. In the illustrated embodiment, the first communication terminal 46 is a universal serial bus (USB) interface. The connecting box 28 defines a plurality of second fixing holes 282 in one of the plurality of third side walls 284 to securely fix the first filter 40 on the outer surface of the connecting box 28.

Figure 4:
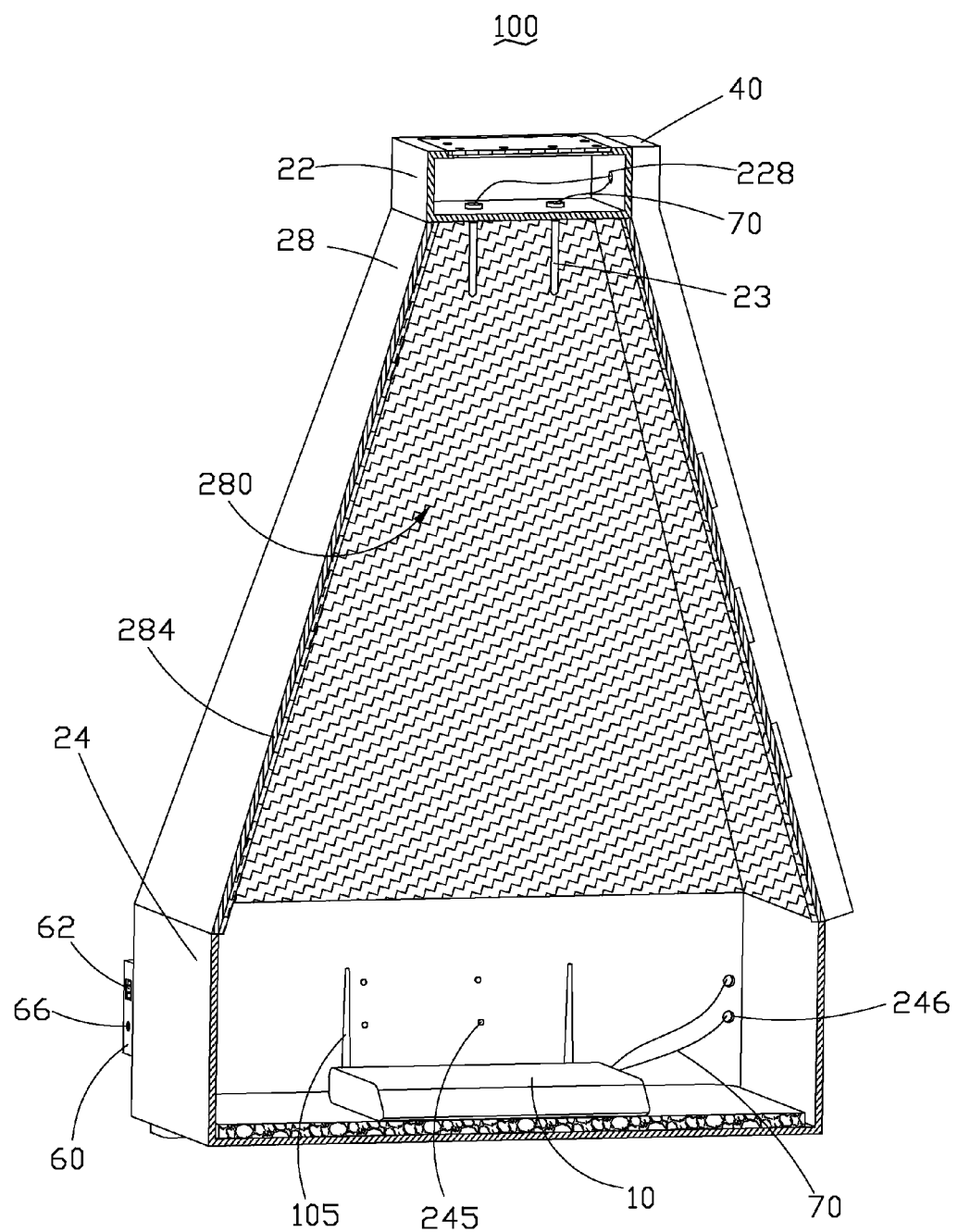
FIG. 4 is a sectional view of the exemplary embodiment of the RF testing apparatus on another direction in accordance with the present disclosure.

Referring to FIG. 4, the DUT 10 comprises a receiving antenna 105 to receive wireless communication signals sent by the transmitting antennas 23. In the illustrated embodiment, the DUT 10 has a pair of receiving antennas 105, but not limit to, it may be one, two, three or others. The receiving box 24 communicates with the through cavity 280, and the pair of receiving antennas 105 receives the wireless communication signals sent by the pair of transmitting antennas 23 to test the DUT 10. The receiving box 24 defines a plurality of first fixing holes 245 and a pair of second through holes 246 on the second side walls 244. The second filter 60 is securely fixed on the second side wall 244 of the receiving box 24 by screws locked into the plurality of first fixing holes 245. The second filter 60 electrically connects with the DUT 10 by the electrical wires 70 passing through the pair of second through holes 246.

The second filter 60 comprises a second communication terminal 62 and a power terminal 66. In the illustrated embodiment, in the second filter 60 and the shielding box 20, the second communication terminal 62 and the power terminal 66 are electrically connected with corresponding terminals of the DUT 10 by the electrical wires 70, respectively. The RF testing apparatus 100 connects with a computer (not shown) by an external wire to send the wireless communication signals received by the receiving antenna 105 to the computer for further analyzing. The power terminal 66 is used to connect with power supply to supply electrical power to the second filter 60 and the DUT 10. In the illustrated embodiment, the second communication terminal 62 is a RJ 45 interface, and the power terminal 66 is a 12V power jack With the connecting box 28 mounted between the transmitting box 22 and the receiving box 24, the connecting box 28 elongates a distance between the pair of transmitting antennas 23 of the RF testing apparatus 100 and the receiving antenna 105 of the DUT 10, so as to increase the frequency width and transmitting stability. Furthermore, the microwave absorption medium 29 is attached on the plurality of third side walls 284 to absorb microwave signals and to prevent microwave signals reflecting.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A radio frequency (RF) testing apparatus for a testing DUT comprising a receiving antenna, comprising:
   a shielding box, comprising a transmitting box, a receiving box and a connecting box connecting between the transmitting box and the receiving box, a pair of transmitting antennas fixed on the transmitting box and suspending towards the connecting box, the connecting box comprising a microwave absorption medium on an inner surface of the connecting box and communicating with the receiving box, the DUT received in the receiving box to wirelessly communicate with the pair of transmitting antennas with the receiving antenna;
   a first filter, mounted on outer surfaces of the connecting box and the transmitting box, and comprising a first communication terminal electrically connecting with the pair of transmitting antennas; and
   a second filter, mounted on an outer surface of the receiving box, and comprising a second communication terminal and a power terminal electrically connecting with the DUT.

2. The RF testing apparatus as claimed in claim 1, wherein the transmitting box comprises a first bottom wall, a plurality of first side walls perpendicularly extending from edges of the first bottom wall, and a cover board opposite to the first bottom wall, the first bottom wall, the plurality of first side walls and the cover board collectively define a first receiving space.

3. The RF testing apparatus as claimed in claim 2, wherein the receiving box comprises a second bottom wall and a plurality of second side walls perpendicularly extending from edges of the second bottom wall, the second bottom wall and the plurality of second side walls collectively define a second receiving space for receiving the DUT.

4. The RF testing apparatus as claimed in claim 3, wherein the connecting box comprises a plurality of third side walls tightly jointed with each other, the plurality of third side walls collectively defines a through cavity communicating with the second receiving space.

5. The RF testing apparatus as claimed in claim 4, wherein the connecting box is made into a funnel-shaped by a punching method.

6. The RF testing apparatus as claimed in claim 4, wherein the microwave absorption medium is attached on the plurality of third side walls to absorb microwave signals and to prevent microwave signals from reflecting.

7. The RF testing apparatus as claimed in claim 6, wherein the microwave absorption medium is substantially configured in a sawtooth shape.

8. The RF testing apparatus as claimed in claim 4, wherein one ends of the plurality of third side walls are securely mounted to tone side of the first bottom wall away from the first side walls, and the other ends of the plurality of third side walls are securely connected to the plurality of second side walls, so that the connecting box is substantially sealed by the first bottom wall the second bottom wall.

9. The RF testing apparatus as claimed in claim 8, wherein the connecting box mounted between the transmitting box and the receiving box elongates distance between the transmitting antennas and the receiving antenna to increase the frequency width and transmitting stability.

10. The RF testing apparatus as claimed in claim 3, wherein the receiving box comprises a shielding door pivoting to one of the plurality of second side walls to put the DUT into the receiving box, and a handle fixed on the shielding door to open or close the shielding door.

11. The RF testing apparatus as claimed in claim 3, wherein the receiving box comprises a foam portion for holding the DUT, the foam portion is configured on the second bottom wall to absorb microwave signals and to prevent microwave signals from reflecting.

12. The RF testing apparatus as claimed in claim 1, wherein the first communication terminal is a universal serial bus (USB) interface, and the second communication terminal is a RJ45 interface.

* * * * *